(12) United States Patent
Harrington et al.

(10) Patent No.: US 6,733,045 B2
(45) Date of Patent: May 11, 2004

(54) COUPLING ASSEMBLY FOR FLUID DELIVERY

(75) Inventors: David T. Harrington, Erie, PA (US); Gary C. Salisbury, Girard, PA (US)

(73) Assignee: Harrington, Inc., Erie, PA (US)

( * ) Notice: Subject to any disclaimer, the term of this patent is extended or adjusted under 35 U.S.C. 154(b) by 0 days.

(21) Appl. No.: 10/120,994

(22) Filed: Apr. 12, 2002

(65) Prior Publication Data

US 2003/0193193 A1 Oct. 16, 2003

(51) Int. Cl.[7] .............................................. F16L 27/00
(52) U.S. Cl. .................. 285/148.19; 285/376; 285/360; 285/143.1; 285/90
(58) Field of Search .............................. 285/376, 334.1, 285/401, 143.1, 136.1, 390, 360, 90, 333, 32, 38, 148.19

(56) References Cited

U.S. PATENT DOCUMENTS

| | | | | | |
|---|---|---|---|---|---|
| 176,796 | A | * | 5/1876 | Martin | 285/148.19 |
| 278,800 | A | * | 6/1883 | Kline | 285/148.19 |
| 731,635 | A | * | 6/1903 | Vandegrift et al. | 285/148.19 |
| 1,273,859 | A | * | 7/1918 | Hochberger | 285/390 |
| 1,639,813 | A | * | 8/1927 | Schawrow | 285/148.19 |
| 2,333,243 | A | * | 11/1943 | Glab | 285/148.19 |
| 4,000,753 | A | * | 1/1977 | Ellis | 285/90 |
| 4,141,574 | A | * | 2/1979 | Stansifer et al. | 285/91 |
| 4,173,989 | A | * | 11/1979 | Prest | 285/390 |
| 4,402,531 | A | * | 9/1983 | Kennedy, Jr. | 285/148.19 |
| 5,301,985 | A | * | 4/1994 | Terzini | 285/376 |
| 6,102,444 | A | | 8/2000 | Kozey | |
| 6,102,450 | A | * | 8/2000 | Harcourt | 285/401 |
| 6,447,027 | B1 | * | 9/2002 | Lilley et al. | 285/360 |
| 6,450,542 | B1 | * | 9/2002 | McCue | 285/148.19 |
| 6,578,876 | B2 | * | 6/2003 | Guertin, Jr. | 285/148.19 |

* cited by examiner

Primary Examiner—David Bochna
(74) Attorney, Agent, or Firm—Kenneth W. Wargo (57) ABSTRACT

A coupling or adapter assembly that serves as a transition device for interconnecting a fluid source, such as a fire hydrant, to a conduit, piping system or hose includes an adapter portion of generally cylindrical configuration having a fluid conveyance bore of non-uniform diameter extending therethrough and annular threads at opposed ends of the adapter portion. The annular threads at one end of the adapter portion are of a stepped threaded configuration in order to engage the inner annular double threaded configuration of a ring member that is externally threaded onto the adapter portion thereby binding the adapter portion to the ring member so that they function as an integral, one piece transition device interconnecting, for example, a fire hydrant to a Storz-type coupling of a hose or conduit.

24 Claims, 12 Drawing Sheets

COUPLING ASSEMBLY FOR FLUID DELIVERY

BACKGROUND OF THE INVENTION

The present invention pertains to couplings and adapters for connecting a fluid source to a load or conduit, and, more particularly, pertains to a transition device such as a coupling or adapter that interconnects a hose or conduit to a fire hydrant so that fluid can be conveyed from the hydrant and through the transition device to the hose or conduit.

In general such a device or apparatus is often disposed between the fluid source that may be a tank, container, vat, or hydrant, and the hose, conduit, plumbing, or piping system that is being brought into flow communication with the fluid source. The device or apparatus operates as an intermediate or transition structure to allow for a quick connect and disconnect of, for example, the hose from the fluid source. Such a device or apparatus also permits connection of the hose to the fluid source when a direct attachment cannot be made because of the dissimilar physical configuration between the coupling structure of the fluid source and the coupling structure of the hose, conduit, plumbing or piping system.

Transition or intermediate connection devices are also used with regard to fire hydrants and hoses. In general a typical fire hydrant is a hollow iron structure having an interior vertical chamber that is connected to an underground conduit that is part of a public water system. The fire hydrant includes a number of outlets or hydrant connectors that extend horizontally from the iron structure and which are in flow communication with the interior vertical chamber. The transition device or apparatus interconnects these hydrant connectors to one or more hoses, and allows for the quick connect and disconnect of the hoses from the transition device.

The standard method of connecting the hose to the hydrant connector is for each hydrant manufacturer to provide a brass nozzle, with an interior end engaged with the hydrant connector, and a distal end which projects from the hydrant connector. The various hydrant manufacturers use differing structures on the interior ends of the nozzles to engage them to the hydrant connector, with some being threaded and others having patterns of rectangular-shaped ridges or elevations, sometimes also called interrupted screw lugs. In other words, a notable disadvantage of hydrant nozzles has been that each manufacturer's nozzle is not mounted to the hydrant connector of its hydrants in the same manner as with other manufacturer's hydrants; since there are a multitude of hydrant manufacturers, simplification and standardization in use cannot be easily achieved. On the other hand, the distal ends of the nozzles generally include external threads. The distal end of the nozzle is capped when the hydrant is not in use and a fire hose can be threadedly attached when needed to the distal end of the nozzle. Direct-threaded engagement between the distal end of the nozzle and a hose, however, has a number of drawbacks. It can be difficult to properly align the nozzle and hose to begin the threading process, and a number of complete revolutions must be made to achieve a tight connection. This takes time, which can of course be critical in a fire emergency. There are also different hose thread specifications for different fire hoses, which has proven to be a large obstacle to standardization. It is not unusual to have neighboring communities use fire hoses which are not interchangeable because of the different hose thread specifications, thereby making mutual assistance work difficult. Threaded engagement between the nozzle and hose can also lead to a loss of water and pressure due to leakage from the threaded joint. This can also be critical in a fire. For these and other reasons it is desirable to provide an alternative coupling interface between nozzle and hose, for instance a Storz-type coupling which allows for quick connection and disconnection.

A representative transition apparatus is disclosed in the Kozey patent (U.S. Pat. No. 6,102,444). The Kozey patent discloses a Storz-type coupling which permits a quick connect and disconnect of a hose from a fluid source.

The Kozey coupling includes an inner annular part that is assembled to an outer annular part. The inner annular part includes external threads and a pair of spaced-apart lugs that fit into L-shaped grooves of the outer annular part, and the outer annular part includes internal threads. The parts are assembled together by turning or rotating the lugs within the L-shaped grooves simultaneous with the threadable engagement of the internal and external threads.

However there remains a need for an improved transition device such as a coupling or adapter wherein the parts are mechanically bound together to function as a one piece unit in order to enhance the operation of the transition device when mounted to the hydrant, and to which a hose or conduit with a Storz-type coupling may be connected quickly, saving crucial seconds. There remains a need for an improved transition device which can be manufactured from the stock of nozzle blanks used by hydrant manufacturers. Likewise, there remains a need for an approved transition device which can be conveniently installed at the factory by hydrant manufacturers, thereby encouraging the spread of the use of Storz-type fittings. There also remains a need for a portable transition device which can be carried by fire companies likely to encounter hydrants with different fittings, thereby enabling said companies to use Storz-type fire hoses even on conventional hydrants. There also remains a need for an approved transition device easily adaptable to be used with hydrants of different manufacturers, while providing a reduced lateral extension profile.

SUMMARY OF THE INVENTION

The present invention comprehends adapter assemblies for disposition between, and interconnection to, two separate structural members, and, more particularly, comprehends coupling or adapter assemblies that interconnect a fluid source to a conduit, pipe or hose. Although the description herein is primarily directed to outflow applications, such as fire hydrants, it should be readily appreciated that the invention is equally useful in inflow applications, where the conduit, pipe or hose is being used to conduct fluid into a reservoir.

The present invention includes two primary structural elements that can be mechanically bound together in order to function as an integral one-piece unit thereby interconnecting, in its most typical use, a fire hydrant to a fire hose.

The present invention serves as a transition device or coupling assembly, and includes a generally cylindrical adapter or body portion. The adapter portion includes a first source or outlet end and an opposite interior second end. A fluid conveyance bore extends from the first source end to the opposite second end, and the fluid conveyance bore tapers radially inwardly from the first outlet end and then transforms to a uniform diameter whereupon the bore extends to the second interior end maintaining the uniform diameter therethrough. The first outlet end can include either external annular threads or other engagement structure, and at least one exterior rib or flange circumambient the adapter body at a location where the fluid conveyance bore is of uniform diameter. In addition, the adapter body portion includes at least one, and preferably two, annular exterior stepped threaded sections that are adjacent one another and circumjacent that part of the fluid conveyance bore that is of uniform diameter.

The other structural element that is mechanically fixed to the adapter portion in order to form the transition device is a ring portion. The ring portion is a cylindrical structure that includes a ring bore which is coaxially disposed relative to the fluid conveyance bore when the ring portion is adjoined to the adapter body portion. The ring portion also includes at least one, and preferably two, protrusions that are integrally formed from, and extend coaxial to the ring portion, and each protrusion includes a laterally extending lip. The ring portion includes an inner annular working surface that engages the annular stepped threaded sections of the adapter body portion, and the working surface includes and merges with the curved interior surfaces of the protrusions. Moreover, the curved interior surfaces of the protrusions include a first inner threaded portion coextensive with the respective interior surfaces. The inner annular working surface of the ring portion is further defined by a second interior threaded portion circumjacent the ring bore. The diameter of the second interior threaded portion is greater than the diametrical distance of the first inner threaded portions from each other as measured across the ring bore. The ring portion also includes at least one annular channel formed adjacent to the protrusions and which cooperates with the lips and the protrusions for securing the ring portion to the Storz-type coupling of the conduit or hose. The stepped threaded sections of the adapter body portion engage the first and second interior threaded portions of the ring portion when fixing the ring portion to the adapter body portion.

It is an objective of the present invention to provide a coupler assembly wherein the number of primary structural elements are reduced while improving essential function of serving as a transition device for interconnecting a fluid source to a conduit or hose.

It is another objective of the present invention to provide a coupler assembly wherein the failure-prone part, i.e., a gasket, is eliminated by the design of the primary structural elements comprising the coupler assembly. The adapter body and the ring portion can be joined with no need for a gasket, thereby obviating the need for periodic maintenance and replacement of this part.

It is yet another objective of the present invention to provide a coupler assembly that improve s the fluid flow from the fluid source to the hose through an improved interior bore configuration. The elimination of the gasket avoids a fluid flow disruption point and the fluid conveyance bore taper provides for smooth fluid flow.

It is still yet another objective of the present invention to provide a coupler assembly that enhances theft resistance by the manner of permanently securing the primary structural elements together thereby presenting increased difficulties for their removal from the fire hydrant. Because nozzles and components of the coupler assembly are made of brass, an expensive metal attractive for sale to scrap dealers, this can be an important consideration.

It is a still further objective of the present invention to provide a coupler assembly that reduces the lateral extension of the coupler assembly from the hydrant, thus decreasing the possibility of damage and interference from passing vehicles. The reduced lateral extension is achieved through use of stepped threaded sections. Given the congestion in urbanized areas where hydrants are most likely to be used, and the emphasis placed on widening roads to better accommodate traffic, any reduction in lateral extension will be beneficial.

Yet another objective of the present invention is to provide a coupler assembly that minimizes the possibility of corrosion and related corrective maintenance by having at least one of the primary structural elements being composed of brass or bronze. The device of the present invention also provides for extreme flexibility in a choice of materials as desired. In addition to brass or bronze, the device may be machined from other metals, for example aluminum, or made from a synthetic material such as structurally reinforced polymer.

Yet another objective of the present invention is to provide a coupler assembly that minimizes the possibility of a fluid leak by making the use of a seal or gasket unnecessary. Although the invention has application beyond that of fire hydrants and hoses, it is of particular note that the loss of water and pressure in fighting fires can literally be a life-and-death matter, so the significance of this objective cannot be overstated.

Yet a still further objective of the present invention is to provide a coupler assembly that maximizes fluid flow from the fluid source to the conduit or hose, for example, by factory-mounting the coupler assembly to the hydrant.

A yet still further objective of the present invention is to provide a coupler assembly that complies with all manufacturing, safety, and fire protection standards by having the primary structural elements of the coupler assembly surface treated and composed of the appropriate materials.

These and other objects, features, and advantages of the present invention will become apparent to those skilled in the art upon a perusal of the entire disclosure herein in conjunction with the accompanying drawings.

DETAILED DESCRIPTION OF THE PREFERRED EMBODIMENT

Illustrated in FIGS. 1 through 15 are various embodiments, including prior art embodiments, for adapter or coupler assemblies that are used to interconnect a fluid source, or reservoir, to some type of outlet, or inlet, such as conduit, hose or fluid distribution system. Although the primary use of the adapter assemblies shown in FIGS. 1 through 15 is in the specific field of serving as a transition device between and interconnecting a fire hydrant and a fire hose, such coupler or adapter assemblies can be used in any environment where a fluid substance is dispersed or distributed under low or high pressure.

Figure 1:
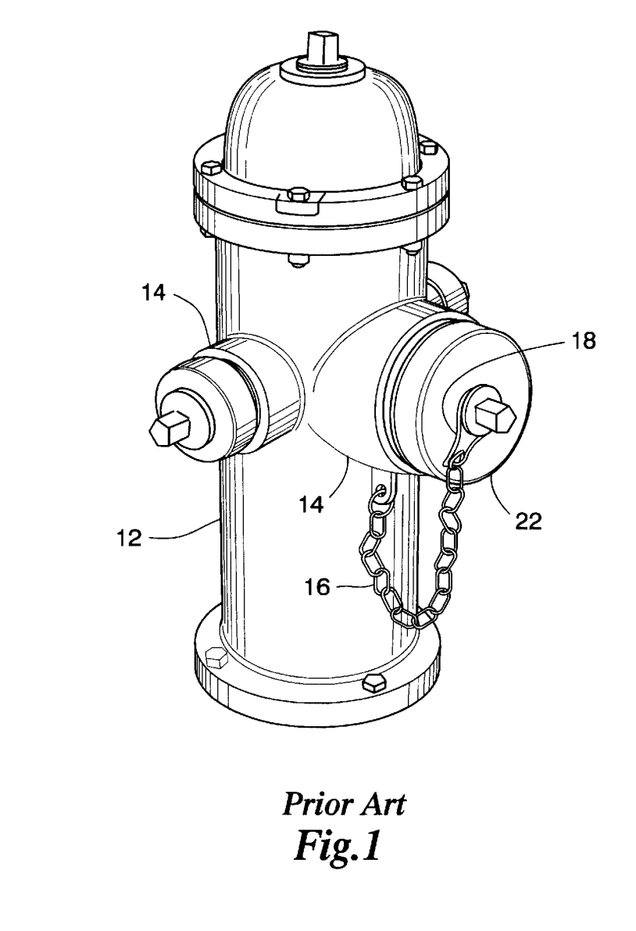
FIG. 1 is a perspective view of a nozzle and cap representing the prior art mounted to a fire hydrant.
Figure 2:
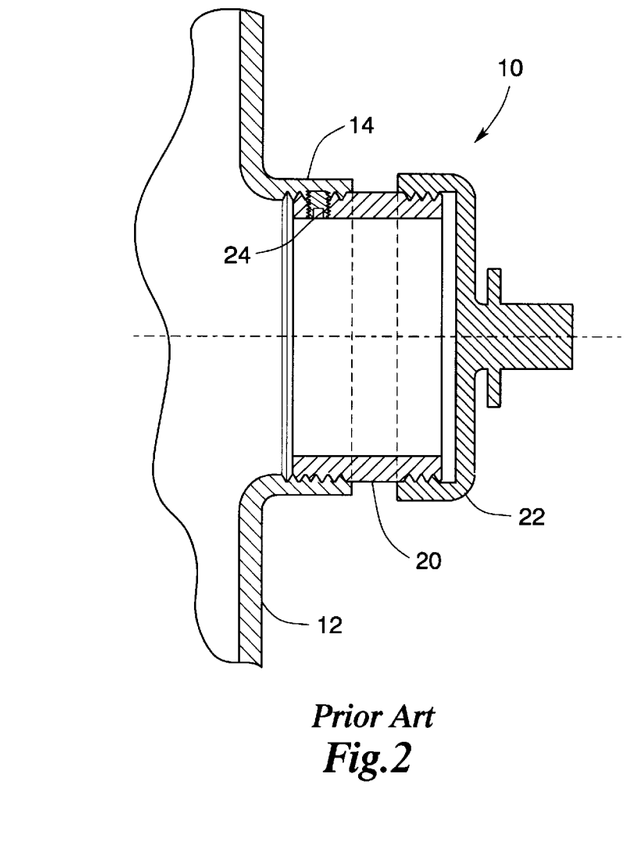
FIG. 2 is a sectioned elevational view of the nozzle and assembly first shown in FIG. 1.

FIGS. 1 and 2 illustrate a common nozzle assembly 10 that is well known prior art. A fire hydrant 12 projects upwardly from the ground and has an interior vertical chamber (not shown) through which fluid is conveyed to one or more laterally extending outlets 14. Mounted to one of the outlets 14 is the nozzle assembly 10, and the nozzle assembly 10 is further secured to the hydrant 12 by a chain 16 and swivel 18. The nozzle assembly 10 includes a cylindrical member referred to as a nozzle 20. The nozzle 20 is usually made of brass and has opposed outlet ends so that one outlet end can be attached to the fire hydrant outlet 14 and the other outlet end receives a closure member or cap 22. Typically, a set screw 24 is internally inserted through the body of the nozzle 20 to further fix the nozzle 20 to the fire hydrant outlet 14. It should be apparent that FIGS. 1 and 2 disclose non Storz-type couplings. To secure a fire hose (not shown), the cap 22 would be removed by using a wrench, and the fire hose would be threadedly engaged to the free outlet end of the nozzle 20.

Figure 3:
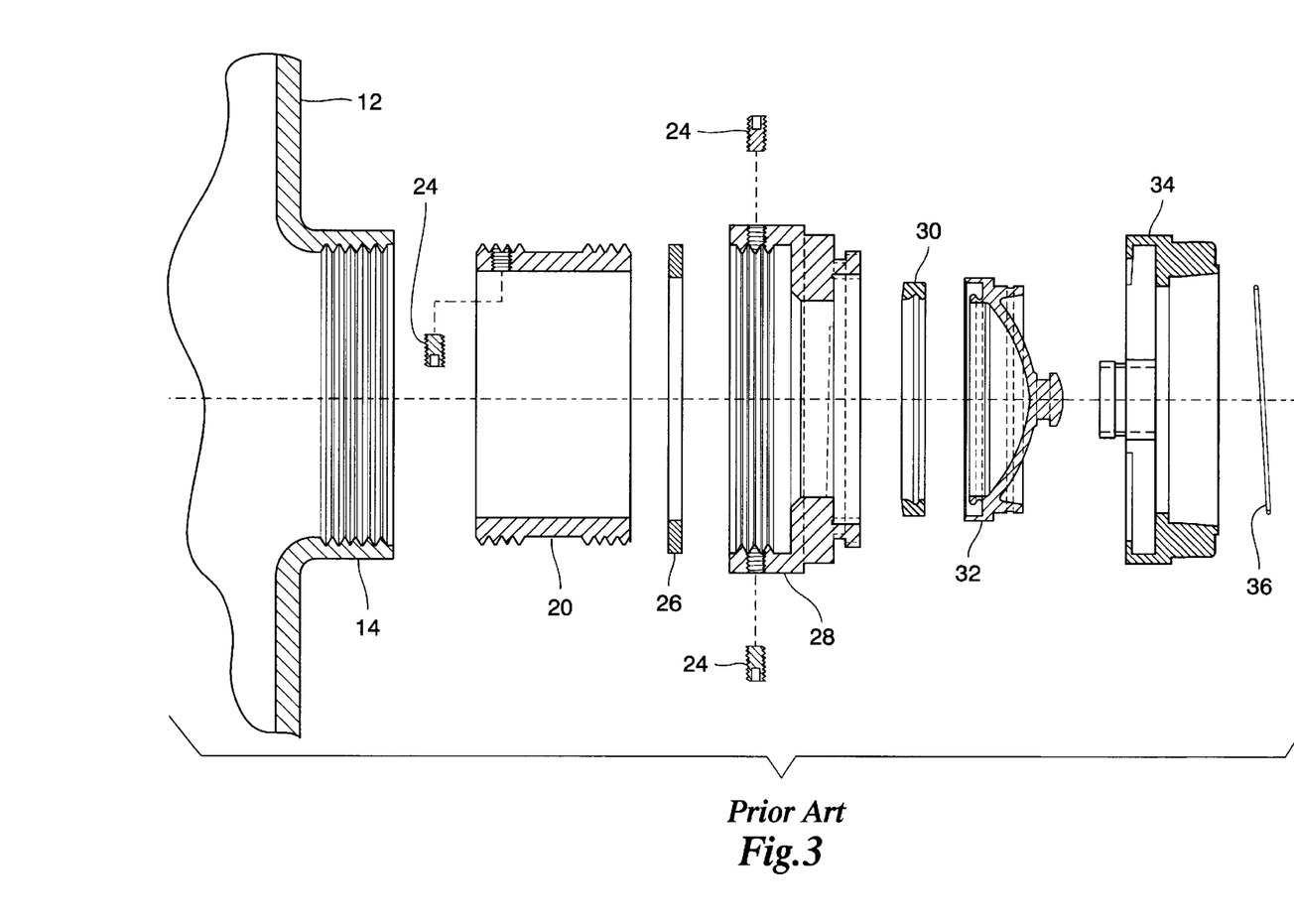
FIG. 3 is an enlarged sectioned elevational view of another version of the prior art, a Storz-type adapter assembly also showing cap and external closure elements that are fitted to the adapter assembly.

In FIG. 3 the nozzle 20 illustrated in FIG. 2 is used with a number of elements to comprise a transition device for a Storz-type fitting well known in the prior art. The elements of the transition device include a gasket 26, an adapter 28 also known as a Storz-type coupling or fitting, a sealing member 30, a cap 32 for closing off the nozzle 20 and the adapter 28, an external closure member 34 and, finally, a sealing member or ring 36. In addition, at least two set screws 24 are externally inserted through the adapter 28 for fixing the adapter 28 to the nozzle 20.

Figure 4:
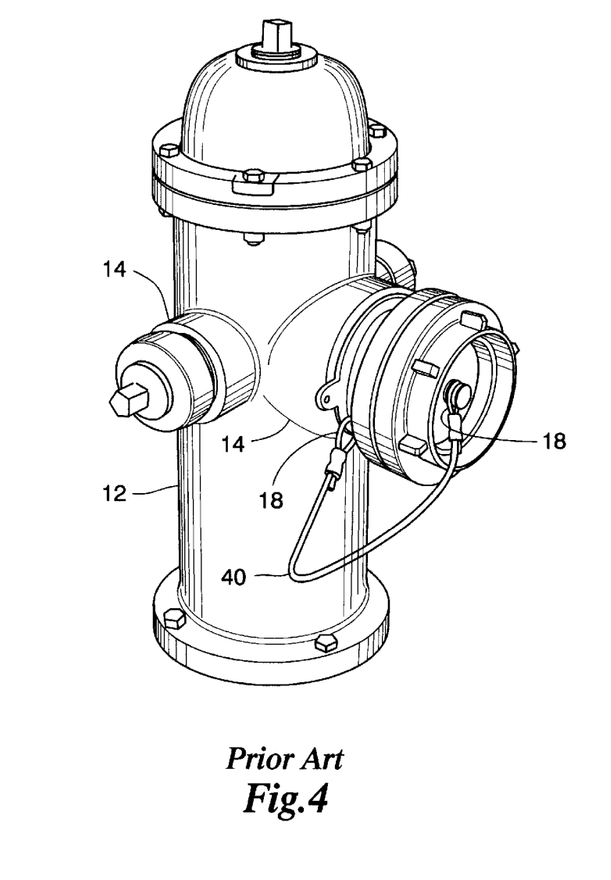
FIG. 4 is a perspective view of a prior art adapter assembly mounted to a fire hydrant.

FIG. 4 illustrates the elements of the transition device shown in FIG. 3 assembled and mounted on to the outlet 14 of the fire hydrant 12. A tether 40 with a swivel 18 at both ends further attaches the transition device to the fire hydrant outlet 14.

Illustrated in FIGS. 5–10 is the primary embodiment of the transition device or apparatus of the present invention. FIGS. 11–15 illustrate other embodiments or variations for the transition device. The primary structural elements that comprise the embodiments of the transition device include a number of common features and also include a number of variations in the design. It should be noted that there is not one preferred embodiment of the transition device. Rather, the various embodiments of the transition device are designed to mount to the various types of fire hydrants currently in use since there is as yet no universal standard for fire hydrant configuration. Moreover, all of the various transition devices illustrated in FIGS. 5–15 are adapted for use with the Storz-type fittings or couplings incorporated on the ends of fire hoses that allow for the quick connect and disconnect from the respective transition devices.

Shown in FIGS. 5–10 is a transition device or apparatus 42 for interconnecting a fluid source to a dispersal media such as a piping system, conduit, or a high pressure fluid hose such as a fire hose. The transition device 42 includes a generally cylindrical adapter or body portion 44 that is specifically securable to an outlet 46 of a fire hydrant 48, and the outlet is internally threaded as shown in FIGS. 5,6,8 and 9. The adapter portion 44 includes a first source or outlet end 50 and an opposite interior attachment end 52, best seen in FIG. 6, and a fluid conveyance bore 54 that extends through the body of the adapter portion 44 from the first outlet end 50 to the second interior end 52. Furthermore, as shown in FIGS. 5,6,8 and 9, the fluid conveyance bore 54 tapers radially inwardly from the first source end 50 to a point within the adapter portion 44 and then changes to a uniform diameter, whereupon the fluid conveyance bore 54 maintains the uniform diameter as the fluid conveyance bore 54 then extends to the second interior end 52.

As shown in FIGS. 5–13 and 15, the adapter or body portion 44 may include either exterior annular threads 56 or other types of engagement structures such as elevated ridges 98 at its first outlet end 50, and the placement of threads or other structures on the adapter body portion 44 is dependent on the particular type of outlet of the fire hydrant to which the adapter body portion 44 is secured. The adapter portion 44 of FIGS. 5–10 and 15 includes annular exterior threads 56 while the adapter portion 44 of FIGS. 11–13 includes alternative structures.

Figure 5:
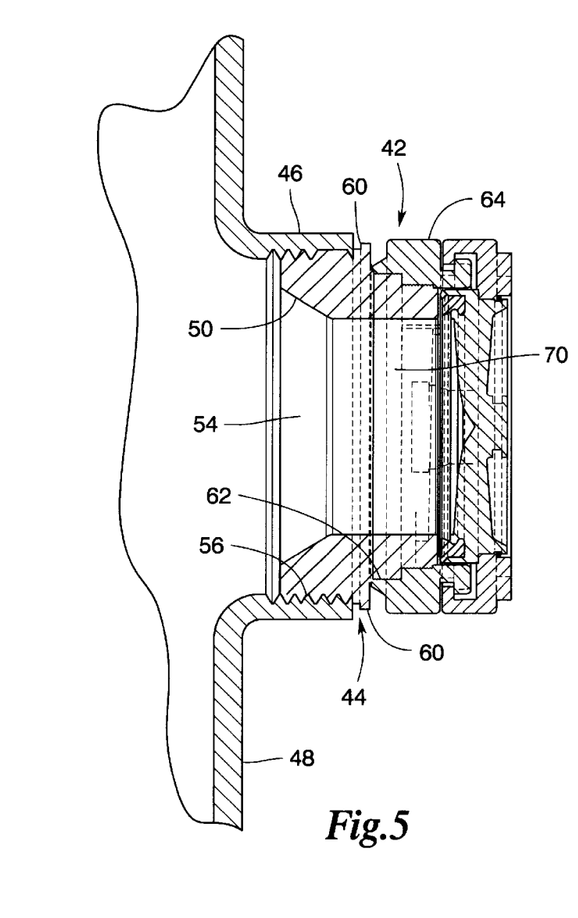
FIG. 5 is a sectioned elevational view of one embodiment of the adapter or coupler assembly of the present invention.
Figure 6:
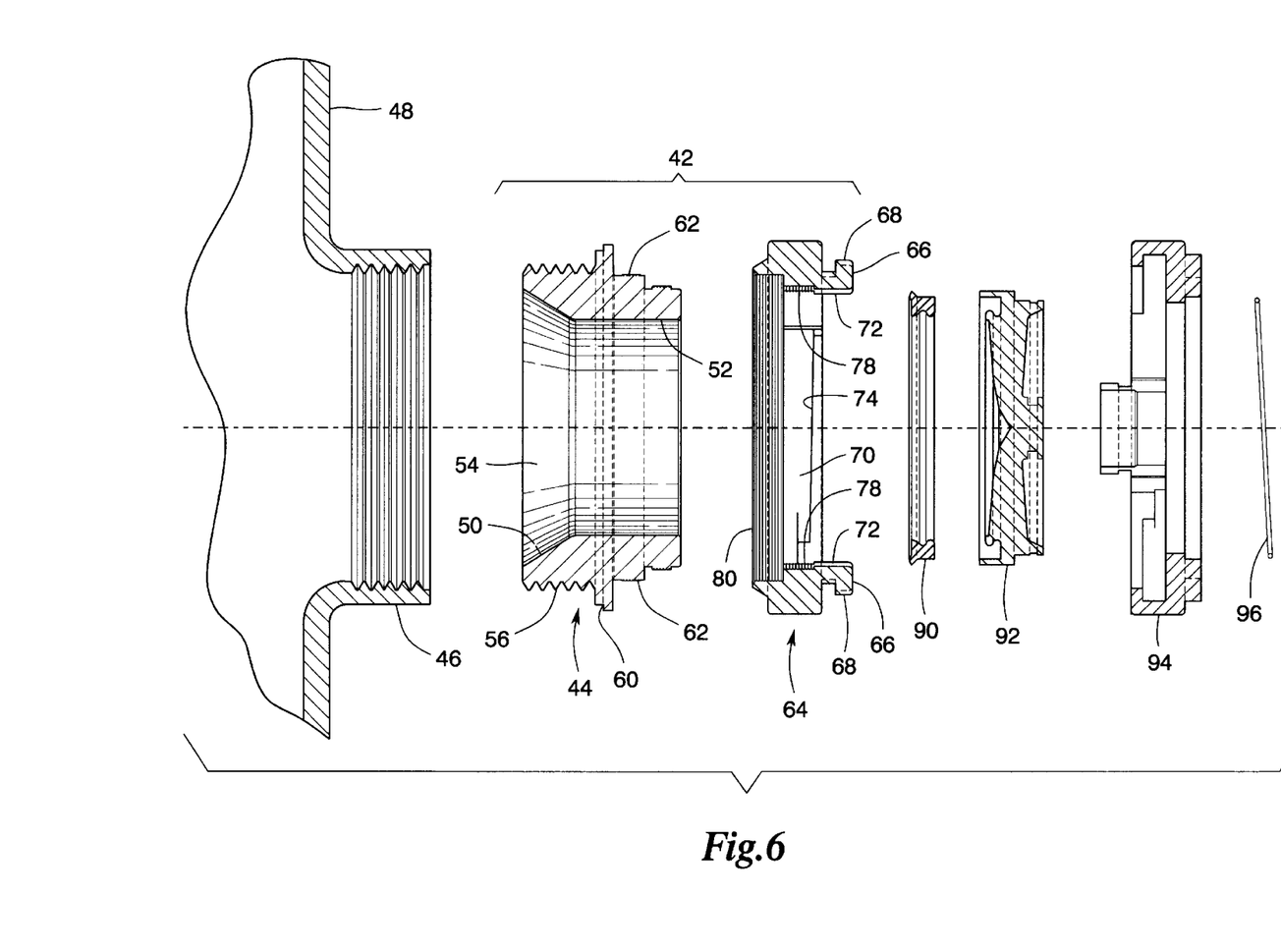
FIG. 6 is an enlarged sectioned elevational view of the coupler assembly shown in FIG. 5 also illustrating external cap and closure elements.
Figure 7:
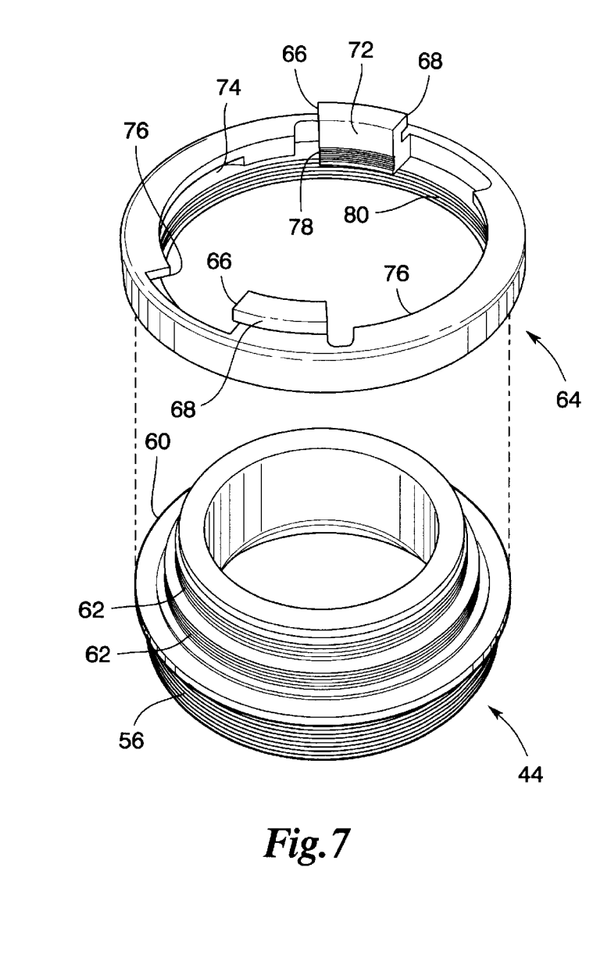
FIG. 7 is a perspective view of the coupler assembly first shown in FIG. 6.
Figure 8:
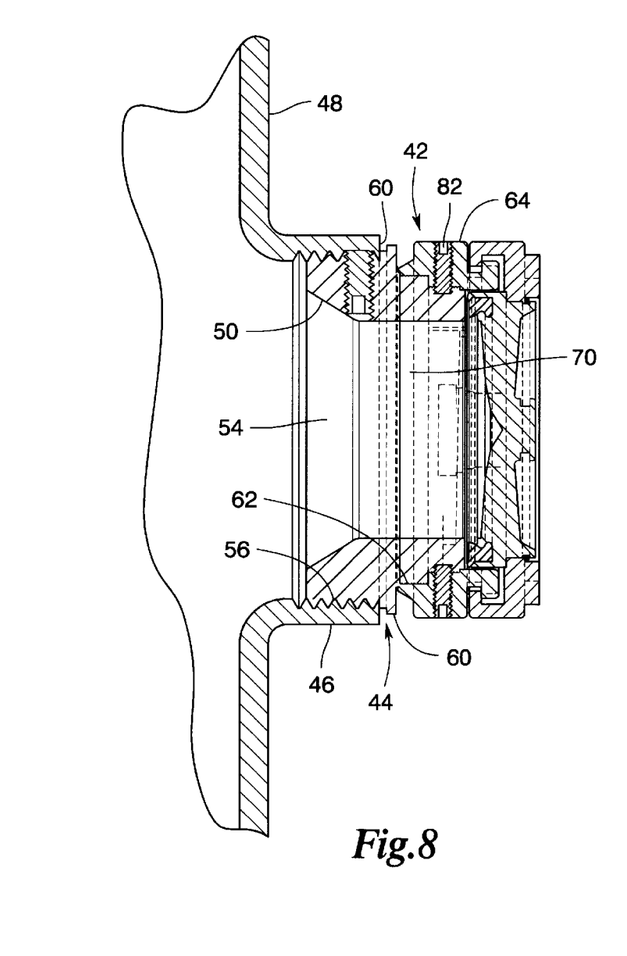
FIG. 8 is sectioned elevational view of the coupler assembly first shown in FIG. 6 illustrating the manner of attachment of the coupler assembly to an outlet of a fire hydrant.

As shown in FIGS. 5–11, 13 and 15, the adapter portion 44 includes at least one exterior circumferentially extending rib or flange 60 that is located adjacent to the exterior annular threads 56 of FIGS. 5–10. Two circumferential ribs or flanges 60 are shown, for example, in FIGS. 5 and 6 with the first rib 60 being closest to the threads 56 and the second rib 60 contiguous to the first rib 60 and having a greater diameter than the first rib 60. The ribs 60 are integrally formed from the adapter body and provide a seat and a stopping point for the adapter portion 44 when the adapter portion 44 is threadably engaged to the outlet 46 of the fire hydrant 48 as illustrated in FIGS. 5 and 8 thus allowing the adapter portion 44 to bottom out at the ribs 60.

As illustrated in FIGS. 5–13, the cylindrical adapter or body portion 44 also includes at least two annular and adjacent stepped threaded sections 62 that are integrally formed exterior on the body of the adapter portion 44. The stepped threaded sections 62 are circumjacent that portion of the fluid conveyance bore 54 that is of uniform diameter and are also located adjacent to the second interior end 52 of the adapter portion 44.

Illustrated in FIGS. 5–13 is the other primary structural component that is mechanically combined and adjoined to the adapter portion 44 to form the transition device that interconnects the fire hose to the fire hydrant 48. Specifically, a ring member or ring portion 64 is threadably fitted to the adapter portion 44 thereby binding both elements together so that they function as a one piece unit or a unitary transition device when interposed between, and thus joined to, the hydrant 48 and hose. It should be noted that in all the embodiments of the transition device, as shown in FIGS. 5–13, the ring portion 64 is mounted externally on and to the adapter portion 44 so that the ring portion 64 circumscribes the body of the adapter portion 44 at the second interior end 52 thereof.

The ring portion 64 includes a number of features that enhance its sealable securement to the adapter portion 44, and also provide for an attachment to the Storz-type coupling or fitting on the hose to allow a quick connect and disconnect to and from the hose. The ring portion 64 includes at least one protrusion 66 that is integrally formed from the cylindrical body of the ring portion 64 and extends coaxially thereto. In FIGS. 5–13, the ring portion 64 includes two protrusions 66 spaced 180 degrees from each other; and it is conceivable that three or more protrusions could also be utilized. Each protrusion 66 has a laterally and outwardly extending lip 68, and in the embodiment of the ring portion 64 having two protrusions 66, the lips 68 project away from each other. The ring portion 64 also includes a ring bore 70, and when the ring portion 64 is fixed to the adapter portion 44, the ring bore 70 and the fluid conveyance bore 54 are disposed in axial alignment and flow communication for transmitting fluid from the hydrant 48 to the hose.

As shown in FIGS. 5–13, each protrusion 66 includes an interior curved surface 72 that faces the ring bore 70, and the interior curved surface 72 is coextensive with the dimension of the protrusion 66. The curvature of each interior curved surface 72 also coincides with circular dimension of the ring bore 70 itself. Formed from the body of the ring portion 64 is at least one pair of interior curvilinear channels 74 whose curvature coincides with the circular dimension of the body of the ring portion 64. The channels 74 are located adjacent to each protrusion 66. Each channel 74 is further defined and bounded by an interior curvilinear overhang or flange 76 generally coequal in length with the respective channel 74. The protrusions 66, the lips 68, and the channels 74 cooperate to interfittingly lock the ring portion 64 to the Storz-type coupling or fitting on the hose, and thus to provide for the quick connect disconnect feature.

As shown most clearly in FIGS. 7 and 10–13, the ring portion 64 can be described as having a double thread feature for threadable engagement with the stepped threaded sections 62 of the adapter portion 44. The double thread feature can be further and more specifically described as comprising an annular threaded portion that is adjacent to one or more discrete threaded portions with the discrete threaded portions being formed on the protrusions 66 themselves and not being circumambient to the ring bore 70. More specifically, located on the innermost part of each interior surface 72 of each protrusion 66 is a first inner threaded portion 78 whose curvature coincides with the curvature of the respective interior surface 72. Each first inner threaded portion 78 comprises essentially the innermost surface of each protrusion 66 which has the threads formed thereon. In addition, a second inner annular threaded portion 80 is formed on the inside surface of the ring portion 64 circumjacent the ring bore 70. The diameter of the second inner threaded portion 80 is greater than the diametrical distance separating the first inner threaded portions 78 and this slight difference in diameter allows the first and second threaded portions 78 and 80 to mateably engage with the stepped threaded sections 62 of the adapter portion 44. This mateable engagement is shown most clearly in FIGS. 5 and 8. This double-thread feature permits the reduction in lateral extension previously identified as one of the objectives of the invention. By utilizing the interior curved surface 72 of the protrusions 66 to provide threaded portion 78, the necessary length of threaded portion 80 may be reduced from what would otherwise be required to maintain an acceptable seal if only threaded portion 80 were used. Additionally, the double-thread feature renders alignment of the adapter body portion 44 and ring portion 64 easier, thereby facilitating threaded engagement of the two parts.

Figure 9:
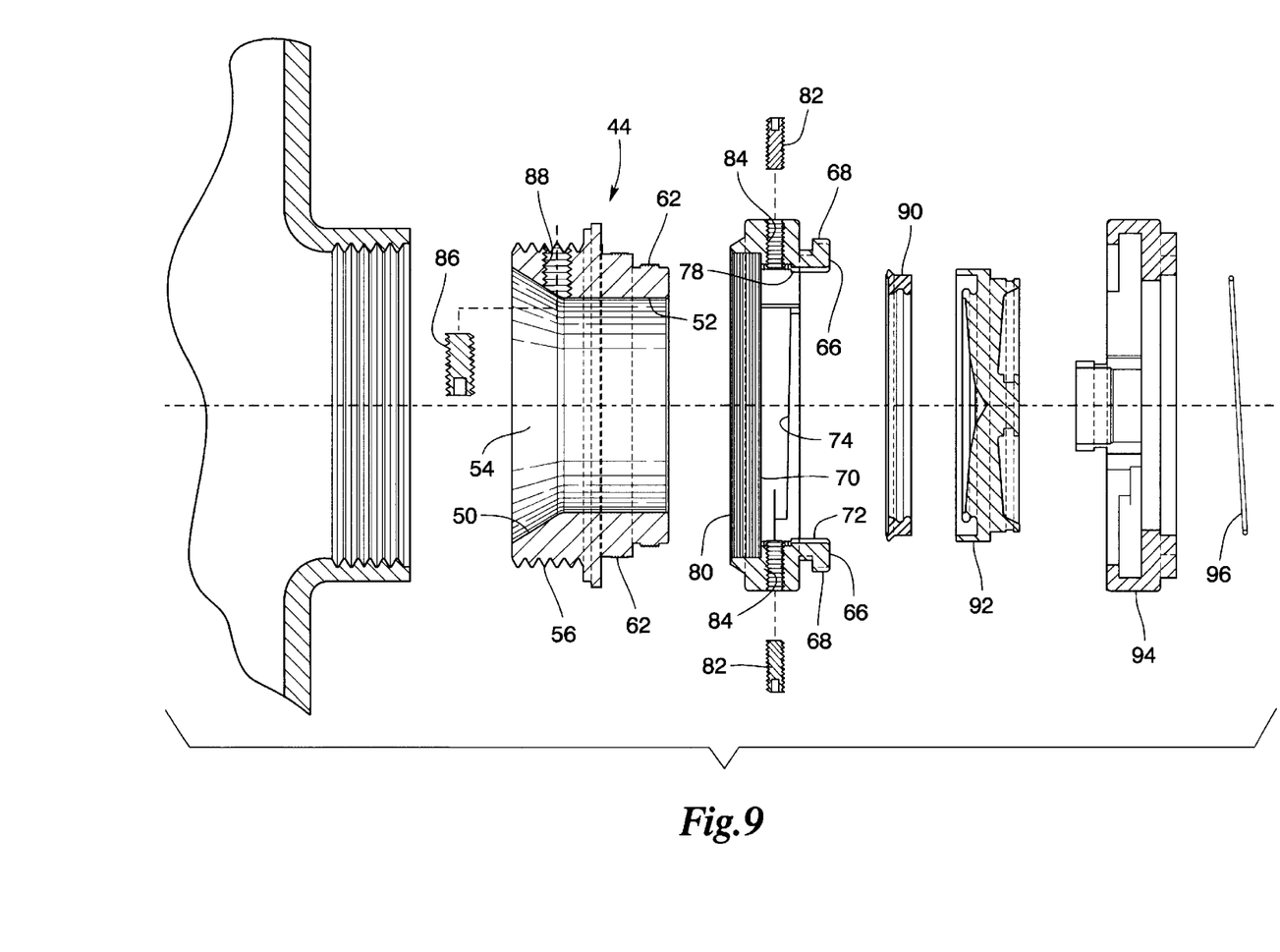
FIG. 9 is an enlarged sectioned elevational view of the coupler assembly first shown in FIG. 6 illustrating the use of set screws to secure together the structural elements of the coupler assembly and to mount the coupler assembly to the outlet of the fire hydrant.
Figure 10:
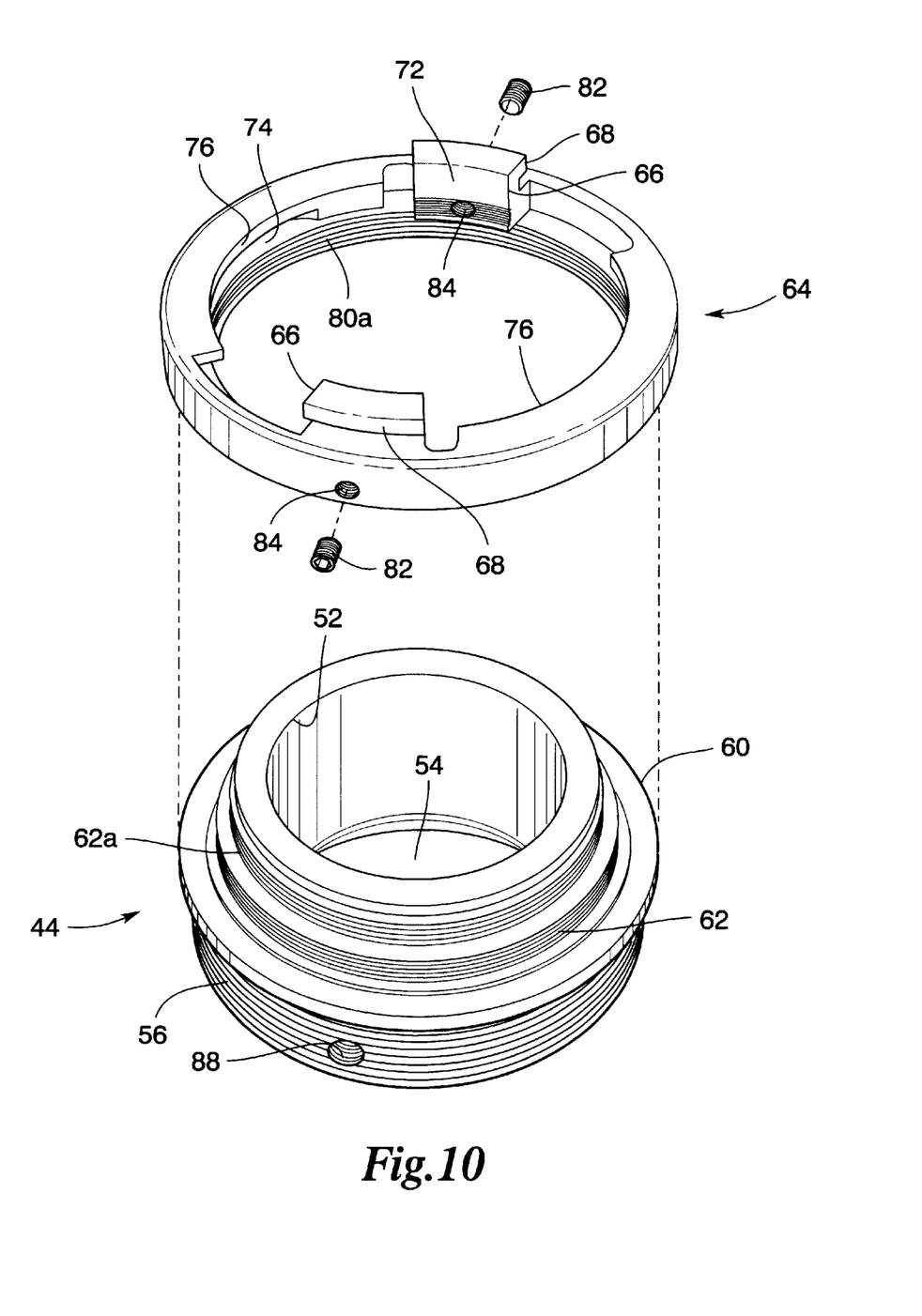
FIG. 10 is a perspective view of another embodiment of the coupler assembly first shown in FIG. 7 showing the use of set-screws to secure together the structured elements of the coupler.

FIGS. 8, 9, 10 illustrate the use of set screws 82 to further enhance the engagement and mechanical binding of the ring portion 64 to the adapter portion 44. The ring portion 64 includes a pair of threaded apertures 84 spaced 180 degrees from each other and internally registering with each first inner threaded portion 78. After the ring portion 64 is mounted on the adapter portion 44, the set screws 82 are threaded through the apertures 84 for physically contacting and engaging the body of the adapter portion 44, and, more specifically, the stepped threaded section 62 of adapter portion 44 at the lesser diameter.

FIGS. 8 and 9 also illustrate the use of an internally disposed set screw 86 to further secure the adapter portion 44 to the outlet 46 of the hydrant 48. In FIGS. 8 and 9, at least one adapter aperture 88 extends through the body of the adapter portion 44 adjacent the first outlet end 50. The adapter aperture 88 registers with the fluid conveyance bore 54 and the set screw 86 is internally threaded through the adapter aperture 88 for engaging the outlet 46 of the fire hydrant 48 as shown in FIG. 9. Also, FIG. 9 shows several elements that are used with the transition device when it is not interconnected to a hose, and these elements which are mounted on to the ring portion 64 include a gasket 90, a cap 92, and externals such as a closure member 94 and a retaining member or snap ring 96.

Figure 11:
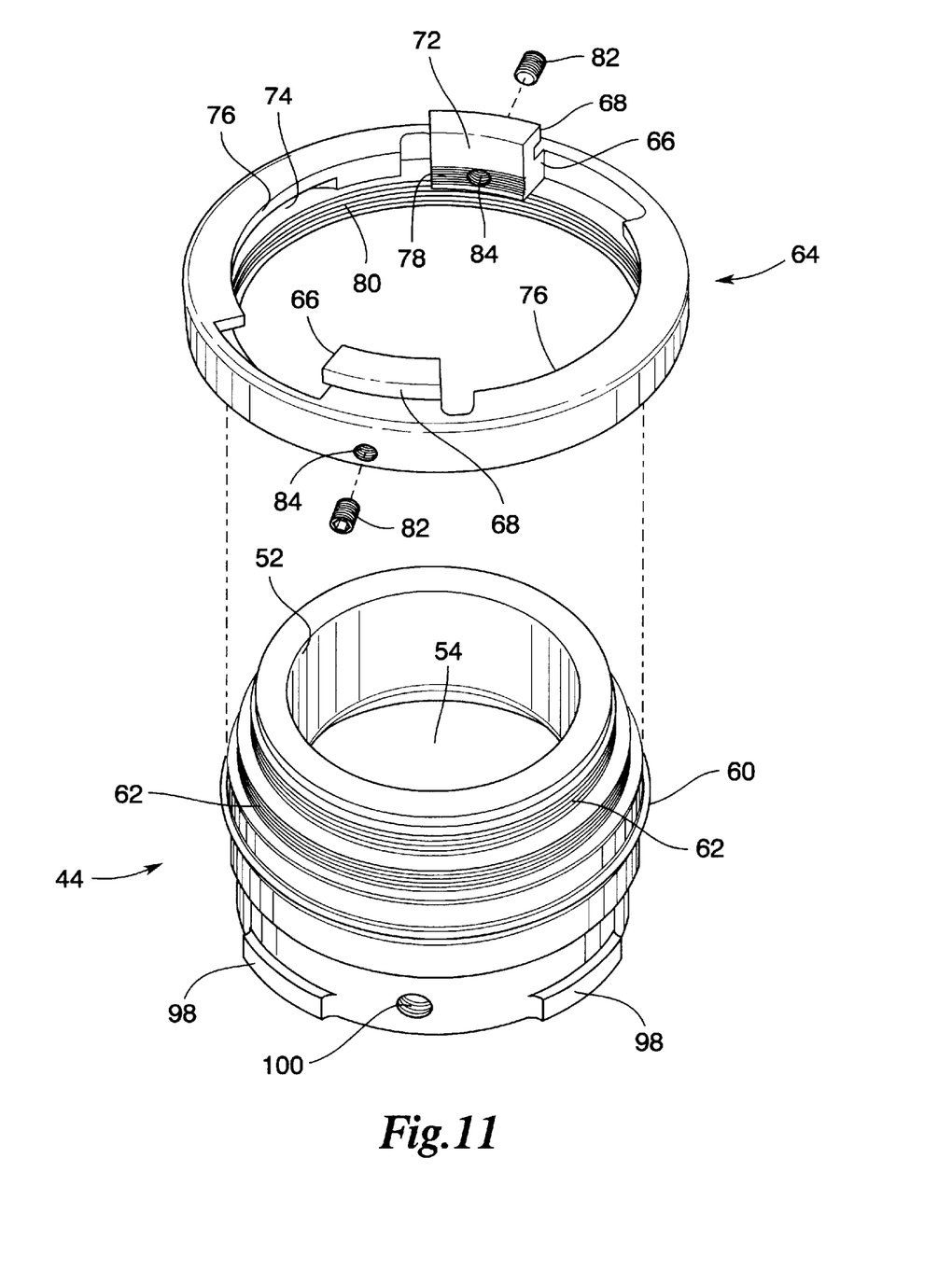
FIG. 11 is a perspective view of another embodiment for the coupler assembly first shown in FIG. 5.
Figure 12:
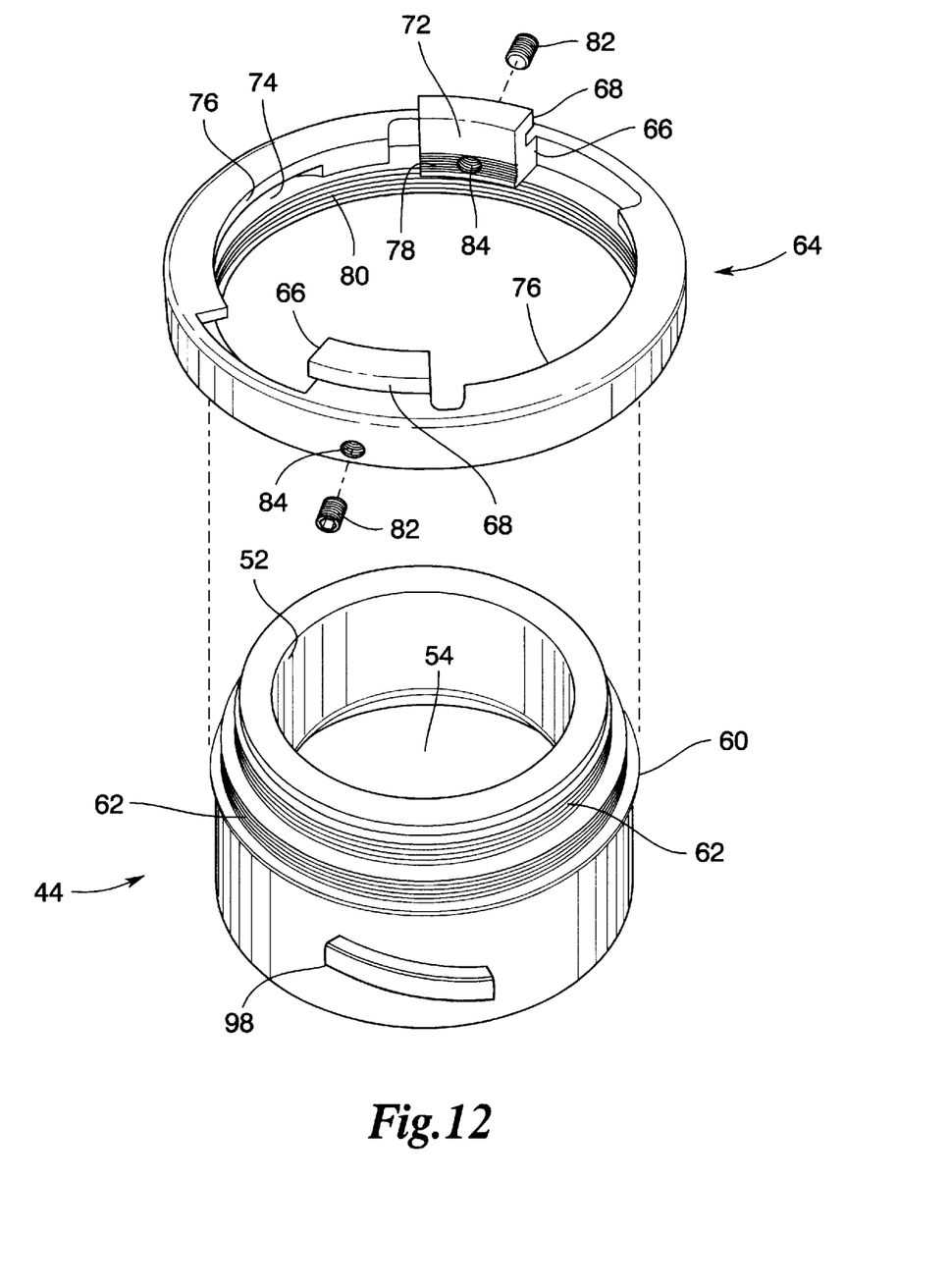
FIG. 12 is a perspective view of yet another embodiment for the coupler assembly first shown in FIG. 5.
Figure 13:
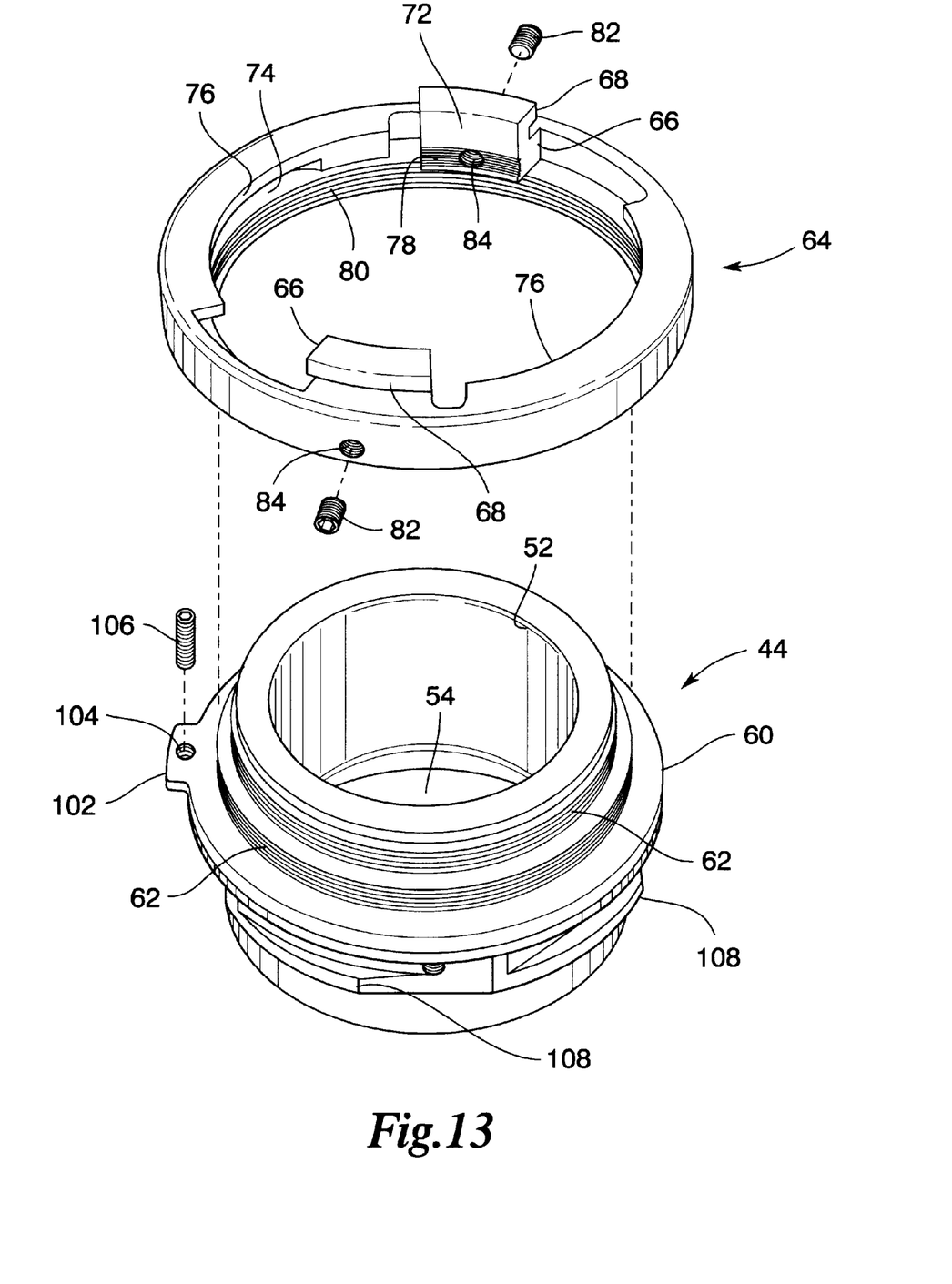
FIG. 13 is a perspective view of still another embodiment for the coupler assembly first shown in FIG. 5.

FIGS. 11–13 illustrate alternative embodiments of the transition device shown in FIGS. 1–10 with the primary difference being that the adapter portion 44 has structures other than exterior threads 56 located adjacent the first outlet end 50 for engagement with hydrant outlet 46. These alternative structures are a function of the hydrant 48 of a particular manufacturer. That is to say, the first outlet end 50 of the invention is structured to mate with the outlet 46, essentially copying the outlet end of the nozzle 20 which would otherwise be inserted into the hydrant 48 by the manufacturer. For instance, the embodiments shown in FIGS. 11 and 12 include generally rectangular-shaped ridges or elevations 98, also called interrupted screw lugs, on the body of the adapter portion 44 that facilitate locking of the adapter portion 44 to the outlet 46 of the fire hydrant 48. The number of elevations 98 and their location on the body of the adapter portion 44 is in conformity with the outlet 46 on the hydrant 48 to which the adapter portion 44 is being mounted. The adapter portion 44 of FIG. 11 also includes at least one threaded aperture 100 extending through the body of the adapter portion 44 adjacent the first outlet end 50 and which registers with the fluid conveyance bore 54. A set screw (not shown) is threaded through the aperture 100 for engagement to the outlet of the particular fire hydrant 48 for facilitating the securement of the adapter portion 44 to the outlet.

FIG. 13 illustrates several variations for the external features that can be included with the adapter portion 44. The adapter portion 44 shown in FIG. 13 includes a tab 102 laterally projecting from the circumferential flange 60, and the tab 102 includes a tab aperture 104 for receiving a set screw 106 that is used to assist in locking the adapter portion 44 to the outlet of the hydrant. In addition, several projections 108 are formed on the body of the adapter portion 44 adjacent the first outlet end 50 and the projections 108 facilitate the connection of the adapter portion 44 to the outlet 46 of the hydrant 48. Other embodiments could be shown illustrating the possible variations of structure on the first outlet end 50 of the adapter portion 44 to correspond with the various manufacturers, and the omission of all possible variations from the drawings should not be seen as limiting the scope of the invention.

Figure 14:
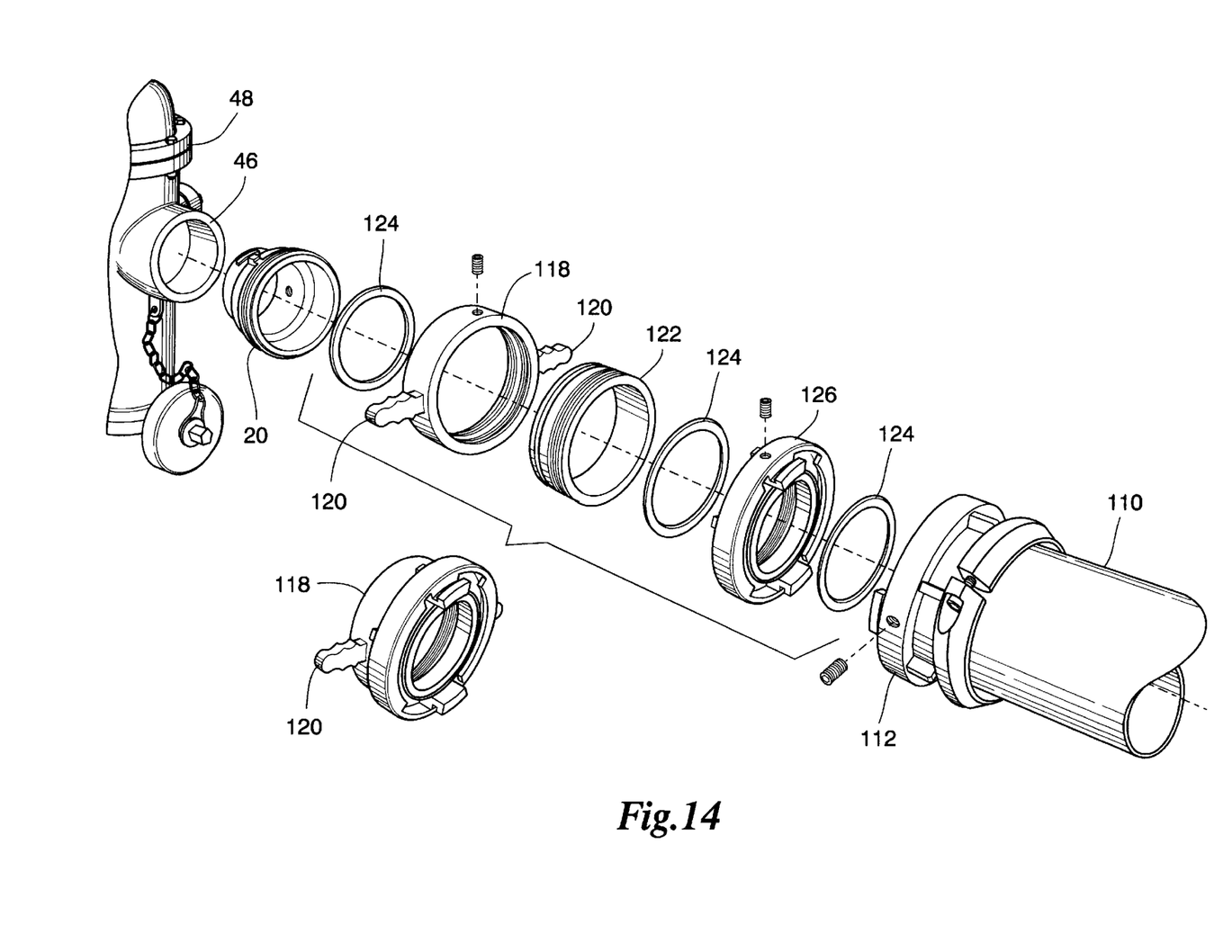
FIG. 14 is an exploded view of still yet another embodiment for the coupler assembly first shown in FIG. 5 illustrating the interconnection of the coupler assembly to the fire hydrant and the fire hose.

FIG. 14 illustrates an embodiment of a transition device that can be utilized where several fire departments use the same hydrant but each fire department employs hoses having different hose fittings that would include both conventionally threaded hoses and hoses that accommodate Storz-type couplings and fittings. The hydrant 48 includes an outlet 46 with a conventional nozzle 20 receivable therein. Fire hose 110 has a Storz-type coupling or fitting 112 assembled to it. The primary structural elements of the transition device of FIG. 14 are a floating cylindrical handle 118 having two laterally extending handles 120 and an externally threaded cylindrical adapter fitting 122, corresponding to adapter portion 44 of the other embodiments of the invention. Adapter fitting 122 threadably mates with the ring portion 126, corresponding to ring portion 64 of the other embodiments, with gasket 124 disposed between those parts to provide sealing. The resulting assembly is shown below the bracket in FIG. 14. The floating handle 118 encompasses the adapter fitting 122, and when the floating handle 118 is threadably engaged onto the outlet end of the nozzle 20, the threadable mounting of the floating handle 118 to the nozzle 20 draws the adapter fitting 122 to the nozzle 20. The embodiment of the transition device illustrated in FIG. 14 provides additional flexibility for fire departments and permits them to access any type of fire hydrant currently in use. Instead of the transition device being essentially permanently affixed to the hydrant 48 as would be used with the other embodiments of the invention, the embodiment shown in FIG. 14 would be a portable one carried by the fire department and used when they wish to attach a Storz-type hose to a hydrant 48 with a conventional nozzle 20.

Figure 15:
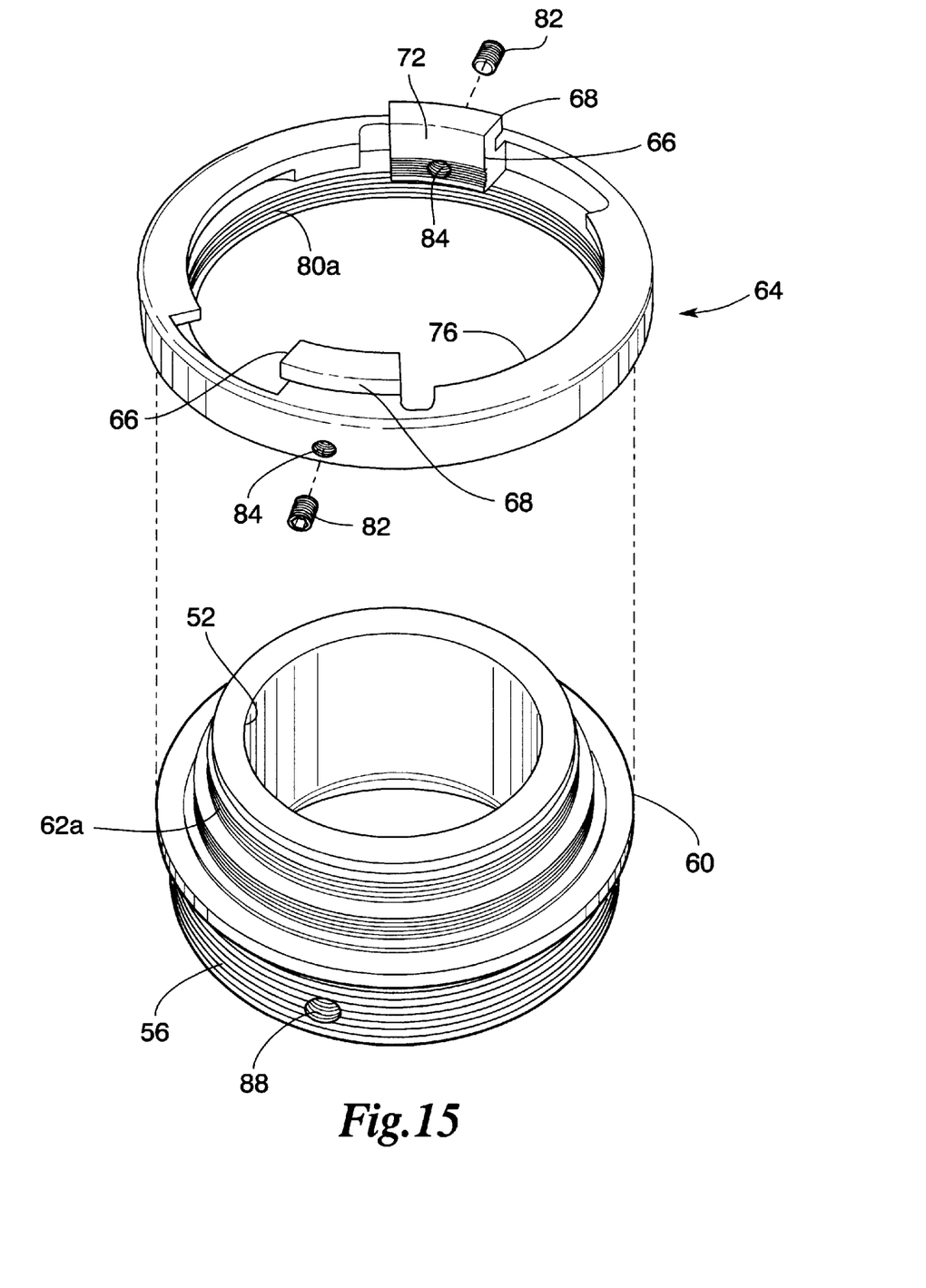
FIG. 15 is a perspective view of another embodiment of the coupler assembly first shown in FIG. 5, illustrating an absence of stepped threaded sections.

Yet another embodiment of the invention is shown in FIG. 15. In this embodiment the double thread is eliminated in favor of a single threaded portion 62a on the adapter portion 44, and a corresponding single threaded portion 80a on ring portion 64. As can be seen, this results in the need to elongate the parts and the reduction in lateral extension achieved in the other embodiments by the double-thread feature is lost. Nevertheless, this alternative embodiment may be useful because it can be machined from the existing stock of nozzle blanks held by manufacturers whereas that might not be possible in some cases with the other embodiments.

It has been found that the coupling assembly for fluid delivery of the present invention works well when the adapter portion 44 is composed of brass or bronze, and the ring portion 64 is composed of aluminum. However, the invention may be made of a wide variety of materials, including non-metal such as structurally reinforced polymer.

The foregoing description discloses and describes a number of embodiments for the invention, and those skilled in the art will understand that other variations and modifications may be possible and practicable, and still come within the ambit of the appended claims.

We claim:

1. A transition apparatus for interconnecting a conduit to a fluid source or reservoir, comprising:

an elongated adapter body having a first source end and an opposite second end, the first source end including engagement structure about a portion of the adapter body;

a circumferential rib bounding the engagement structure;

a pair of annular threaded sections adjacent the rib on the opposite second end, the annular threaded sections being of non-uniform diameter with respect to each other and the diameters of the annular threaded sections being less than the diameter of the rib;

the adapter body having an adapter bore extending from the first source end to the second end and tapering radially inwardly from the first source end to a uniform diameter that is then maintained to the second end;

a ring member for securement to the annular threaded sections including:

a ring bore that is axially aligned with the adapter bore when the ring member is attached to the adapter body;

a first interior annular ring threaded portion circumjacent the ring bore for external engagement to the larger-diameter annular threaded sections of the adapter body and terminating at an inner circumferential ledge;

at least one pair of projecting members extending from the ring member and coaxial therewith and each projecting member including a lip that extends laterally from the projecting member, an interior surface coextensive with the projecting member, a second interior annular ring threaded portion extending along a portion of the interior surface for engaging the smaller-diameter annular threaded section of the adapter body, and a pair of annular, interior coupling channels with each coupling channel adjacent the projecting members and terminating at an abutment and each coupling channel further defined by an annular guide flange coequal in length with the respective coupling channel.

2. The transition apparatus of claim 1 wherein the circumferential rib of the adapter body is stepped, with a smaller-diameter portion adjacent the engagement structure and a larger diameter portion adjacent the annular threaded sections.

3. The transition apparatus of claim 2 wherein the engagement structure comprises annular exterior threads extending along a portion of the adapter body.

4. The transition apparatus of claim 2 wherein the engagement structure comprises a plurality of elevations or projections regularly spaced about the exterior circumference of the adapter body.

5. An intermediate transition device for interconnecting a fluid distribution source or fluid reservoir to a conduit, comprising:

an elongated adapter body that includes:

a first outlet end and an opposite second inner attachment end;

an adapter bore that tapers radially inwardly from the first outlet end to a uniform diameter and then extends with the uniform diameter to the second inner attachment end;

exterior engagement structure for engagement to an outlet of the fluid distribution source or an inlet of the fluid reservoir;

at least one rib inboard of the engagement structure and circumambient the adapter body for providing an abutment surface for the adapter body when the adapter body is secured to the outlet or inlet;

a pair of externally threaded stepped sections adjacent the rib and circumjacent that part of the adapter bore that is of uniform diameter;

a ring portion for assembly to the adapter body including:

at least one protrusion coaxially extending from the ring portion and the protrusion having a first inner threaded portion;

a lip extending laterally from the protrusion and integrally formed therefrom, the lip and the protrusion capable of engaging and locking onto the conduit;

at least one inner annular channel adjacent the protrusion and terminating with an abutment;

a flange coextensive with the channel and bordering the channel;

a pair of internally threaded stepped sections for mateable engagement to the threaded stepped sections of the adapter body; and the adapter body and the ring portion capable of sealable interfitting assembly for operating as an integral one piece unit so that the conduit can be interconnected to the fluid distribution source thereby allowing conveyance of the fluid from the fluid distribution source a fluid reservoir through the adapter bore and ring portion to the conduit, or from the conduit through the ring portion and adapter bore to the fluid reservoir.

6. The intermediate transition device of claim 5 wherein the engagement structure comprises annular exterior threads for threadable engagement.

7. The intermediate transition device of claim 5 wherein the engagement structure comprises a plurality of elevations or projections regularly spaced about the exterior circumference of the adapter body.

8. The intermediate transition device of claim 5 wherein the adapter body is made of brass or bronze.

9. The intermediate transition device of claim 5 wherein the adapter body, or the ring portion, or both, are made of structurally reinforced polymer.

10. A transition device for interconnecting an outlet of a fire hydrant to a hose, comprising:

an elongated, generally cylindrical body portion having a first hydrant connection end and an opposite ring portion defining a second hose connection end;

a fluid conveyance bore tapering radially inwardly from the first connection end to a uniform diameter and then extending through the body portion to the second hose connection end of the ring portion while maintaining the uniform diameter;

engagement structure adjacent the first connection end for mateable engagement to the outlet;

a circumferential rib adjacent the engagement structure for providing an abutment for the outlet when the hydrant connection end has been completely engaged with the outlet;

at least one stepped threaded section adjacent the rib and circumjacent that portion of the fluid conveyance bore that is of uniform diameter;

the ring portion for interfitting assembly to the cylindrical body portion including:

at least one protrusion integrally formed from the ring portion and extending coaxially therefrom, a lip laterally projecting from the protrusion, an interior surface that is coextensive with the protrusion and the interior surface conforming to the curvature of the fluid conveyance bore, a first inner threaded portion formed on the interior surface, a second interior threaded portion circumambient that portion of the fluid conveyance bore that is of uniform diameter, the second interior threaded portion located adjacent and inboard of the first inner threaded portion, at least one inner annular channel adjacent the protrusion for cooperating with the protrusion and the lip to secure the hose to the ring portion; and the first inner threaded portion and the second interior threaded portion capable of threadable engagement to the stepped threaded section for attaching the ring portion to the body portion so that fluid can be directed from the outlet of the fire hydrant through the fluid conveyance bore and thence to the hose.

11. The transition device of claim 10 wherein the engagement structure comprises annular exterior threads for threadable engagement with the outlet of the hydrant.

12. The transition device of claim 10 wherein the engagement structure comprises a plurality of elevations or projections regularly spaced about the exterior circumference of the adapter body.

13. The intermediate transition device of claim 10 wherein the adapter body portion is made of brass or bronze.

14. The intermediate transition device of claim 10 wherein the adapter body portion, or the ring body portion, or both, are made of structurally reinforced polymer.

15. A transition device for interconnecting an outlet of a fire hydrant to a hose, comprising:

a cylindrical body portion for attachment to the outlet, the cylindrical body portion having a first outlet end, an oppositely disposed interior end, a fluid conveyance bore tapering radially inwardly from the first outlet end to a uniform diameter and then extending through the cylindrical body portion to the interior end while maintaining the uniform diameter throughout, and a plurality of exterior stepped threaded sections circumjacent that portion of the fluid conveyance bore that is of uniform diameter;

a ring portion for sealable securement to the cylindrical body portion, the ring portion including at least one protrusion integrally formed from the ring portion and coaxially extending therefrom, a lip laterally projecting from the protrusion, an interior surface that is coextensive with the protrusion and which conforms to the curvature of the fluid conveyance bore, a first inner threaded portion formed on the interior surface, a second interior threaded portion circumambient that portion of the fluid conveyance bore that is of uniform diameter and which is located adjacent and inboard of the first inner threaded portion, at least one inner annular channel adjacent the protrusion for cooperating with the protrusion and lip to secure the ring portion to the hose; and the first inner threaded portion and the second interior threaded portion of the ring portion capable of sealable interfitting external engagement to the stepped threaded sections of the cylindrical body portion for mounting the ring portion on and around the cylindrical body portion so that fluid can be directed from the outlet of the fire hydrant through the fluid conveyance bore and to the hose.

16. The transition device of claim 15 further comprising an annular threaded outlet portion adjacent the first outlet end for threadably engaging the outlet of the fire hydrant.

17. The transition device of claim 16 further comprising at least one exterior rib circumjacent the cylindrical body portion and the fluid conveyance bore where the fluid conveyance bore is of uniform diameter for providing a seat for the cylindrical body portion when the annular threaded outlet portion is completely threaded onto the outlet of the fire hydrant.

18. The transition device of claim 15 further comprising an elevation or projection portion adjacent the first outlet for engaging the outlet of the fire hydrant.

19. The transition device of claim 15 further comprising at least one exterior rib circumjacent the cylindrical body portion and the fluid conveyance bore where the fluid conveyance bore is of uniform diameter for providing a seat for the cylindrical body portion when the annular threaded outlet portion is completely threaded onto the outlet of the fire hydrant.

20. The transition device of claim 19 wherein the ring portion includes two inner annular channels disposed opposite of each other and between the protrusions so that the protrusions and the channels cooperatively engage the hose for interconnecting the ring portion to the hose.

21. The transition device of claim 15 wherein the ring portion includes two protrusions spaced 180 degrees from each other and which extend coaxial to the ring portion.

22. The transition device of claim 15 wherein the ring portion includes three protrusions spaced 120 degrees from each other and which extend coaxial to the ring portion.

23. A transition device for interconnecting the outlet of a fluid source or the inlet of a fluid reservoir to a conduit, comprising:

a cylindrical body portion having a first outlet end, an opposite second interior end, a plurality of annular exterior threaded sections with each exterior threaded section having a diameter that differs from the diameters of the other threaded sections, a fluid conveyance bore extending through the cylindrical body portion from the first outlet end to the second interior end and the fluid conveyance bore tapering radially inwardly from the first outlet end to a uniform diameter and then maintaining the uniform diameter to the second interior end;

a ring portion for sealable attachment to the cylindrical body portion, the ring portion including a ring bore that is coaxial with the fluid conveyance bore when the ring portion is assembled to the cylindrical body portion, at least one protrusion integrally formed from the ring portion and extending coaxially therefrom, the protrusion including a laterally extending lip and an interior body surface having a first inner threaded portion, a second interior threaded portion circumjacent the ring bore and capable of mateable engagement to at least one of the annular threaded sections, at least one inner annular channel adjacent the protrusion and cooperating with the protrusion for attaching the ring portion to the conduit; and the ring portion being externally assembled to the cylindrical body portion so that the first and second threaded portions of the ring portion are interfittingly engaged to the annular threaded sections of the cylindrical body portion whereby the ring portion is sealably and externally secured to the cylindrical body portion with the first outlet end of the cylindrical body portion connected to the outlet of the fluid source and the ring portion connected to the conduit so that fluid can be conveyed from the fluid source through the assembled cylindrical body portion and ring portion and to the conduit, or form the conduit through the ring portion and cylindrical body to the fluid reservoir.

24. The transition device of claim 23 wherein the first outlet end of the cylindrical body portion includes a plurality of spaced-apart ridges that facilitate the connection of the cylindrical body portion to the outlet of the fluid source.

* * * * *